US011197200B2

(12) United States Patent
Yang et al.

(10) Patent No.: US 11,197,200 B2
(45) Date of Patent: Dec. 7, 2021

(54) RADIO SLICE CONTROLLER TO SUPPORT NETWORK SLICING AND QUALITY OF SERVICE

(71) Applicant: Verizon Patent and Licensing Inc., Arlington, VA (US)

(72) Inventors: Jin Yang, Orinda, CA (US); Yuexin Dong, Bridgewater, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 230 days.

(21) Appl. No.: 16/509,633

(22) Filed: Jul. 12, 2019

(65) Prior Publication Data

US 2021/0014737 A1    Jan. 14, 2021

(51) Int. Cl.
*H04W 72/04* (2009.01)
*H04W 76/10* (2018.01)
*H04W 28/20* (2009.01)
*H04W 28/02* (2009.01)
*H04W 76/11* (2018.01)
*H04W 48/18* (2009.01)

(52) U.S. Cl.
CPC ....... *H04W 28/20* (2013.01); *H04W 28/0236* (2013.01); *H04W 28/0268* (2013.01); *H04W 48/18* (2013.01); *H04W 76/11* (2018.02)

(58) Field of Classification Search
CPC ..... H04W 76/11; H04W 28/20; H04W 24/02; H04W 28/0236; H04W 28/0268; H04W 48/18; H04W 24/10; H04W 28/24; H04W 8/20; H04W 88/085; H04W 88/14; H04W 92/24; H04W 72/04; H04L 47/283

USPC .......................................................... 370/229
See application file for complete search history.

(56) References Cited

U.S. PATENT DOCUMENTS

| | | | |
|---|---|---|---|
| 2019/0075552 A1* | 3/2019 | Yu .......................... | H04W 72/04 |
| 2019/0245740 A1* | 8/2019 | Kachhla ................ | H04L 41/082 |
| 2019/0254047 A1* | 8/2019 | Ahmed ................... | H04L 47/30 |
| 2019/0297634 A1* | 9/2019 | Dai ................... | H04W 28/0268 |
| 2019/0372929 A1* | 12/2019 | Yang ..................... | H04L 69/326 |
| 2020/0029200 A1* | 1/2020 | Yu .......................... | H04W 8/20 |
| 2020/0044732 A1* | 2/2020 | Cui ....................... | H04W 76/50 |
| 2020/0068587 A1* | 2/2020 | Garcia Azorero ...... | H04L 67/32 |
| 2020/0195495 A1* | 6/2020 | Parker ................... | H04W 48/18 |
| 2020/0296603 A1* | 9/2020 | Suthar ................ | H04L 67/1076 |
| 2020/0374946 A1* | 11/2020 | Bedekar ................ | H04W 76/10 |

(Continued)

*Primary Examiner* — Rebecca E Song
*Assistant Examiner* — Vanneilian Lalchinthang

(57) ABSTRACT

A device receives performance profiles associated with multiple available distributed units (DUs) of a wireless station, where each of the performance profiles is based on at least one of a network slice or a quality of service (QoS) handled by each respective DU of the multiple available DUs. The device selects a first DU of the multiple available DUs based on the performance profiles, obtains a user equipment's (UE's) user profile and a network performance requirement of the application associated with transport involving the UE, and selects a first user plane function of multiple distributed user plane functions for transport along a first transport path, that includes the selected DU, based on the user profile and the network performance requirements of the application. The device initiates data transport involving the UE via the selected first DU and the selected first user plane function, over the first transport path.

20 Claims, 12 Drawing Sheets

(56) References Cited

U.S. PATENT DOCUMENTS

2020/0383035 A1* 12/2020 Ma ........................ H04W 48/08
2021/0058302 A1* 2/2021 Marquezan ........... H04W 24/08

* cited by examiner

RADIO SLICE CONTROLLER TO SUPPORT NETWORK SLICING AND QUALITY OF SERVICE

BACKGROUND

Long Term Evolution (LTE) is a mobile telecommunications protocol for wireless communication involving mobile user equipment, such as mobile devices and data terminals. LTE networks include existing Fourth Generation (4G), and 4.5 Generation (4.5G) wireless networks. The goals of LTE included increasing the capacity and speed of wireless data networks and redesigning and simplifying the network architecture to include an Internet Protocol (IP)-based system with reduced latency.

Next Generation mobile networks have been proposed as the next evolution of mobile wireless networks, such as the existing 4G and 4.5G LTE mobile networks. Next Generation mobile networks, such as Fifth Generation New Radio (5G NR) mobile networks, are expected to operate in the higher frequency ranges (e.g., in the GigaHertz frequency band) with a broad bandwidth near 500-1,000 MegaHertz. The expected bandwidth of Next Generation mobile networks is intended to support higher speed downloads. The proposed 5G mobile telecommunications standard may operate in the millimeter wave bands (e.g., 14 GigaHertz (GHz) and higher), and may support more reliable, massive machine communications (e.g., machine-to-machine (M2M), Internet of Things (IoT)). Next Generation mobile networks, such as those implementing the 5G mobile telecommunications standard, are expected to enable a higher utilization capacity than current wireless systems, permitting a greater density of wireless users. Next Generation mobile networks are designed to increase data transfer rates, increase spectral efficiency, improve coverage, improve capacity, and reduce latency.

"Network Slicing" is a proposed innovation for implementation in Next Generation Mobile Networks, such as 5G mobile networks. Network slicing is a type of virtualized networking architecture that involves partitioning of a single physical network into multiple virtual networks. The partitions, or "slices," of the virtualized network may be customized to meet the specific needs of applications, services, devices, customers, or operators. Each network slice can have its own architecture, provisioning management, and security that supports a particular application or service. Speed, capacity, and connectivity functions are allocated within each network slice to meet the requirements of the objective of the particular network slice. Network slicing may be implemented in a dynamic fashion, such that the slices of the virtualized network may change over time and may be re-customized to meet new or changing needs of applications, services, devices, customers, or operators.

DETAILED DESCRIPTION OF THE PREFERRED EMBODIMENTS

Figure 1A:
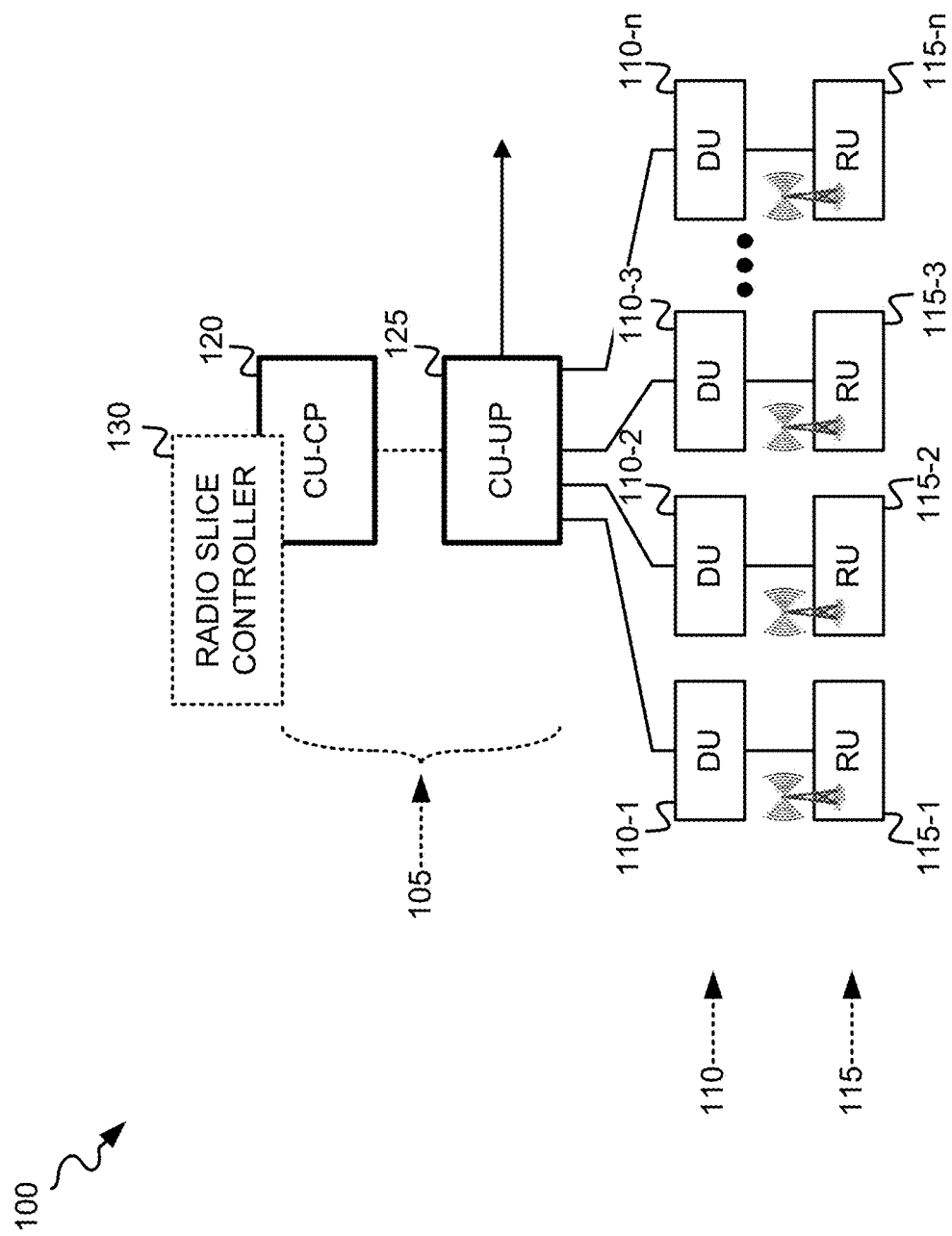
FIG. 1A illustrates the implementation of a radio slice controller in an exemplary base station of a wireless network.

The following detailed description refers to the accompanying drawings. The same reference numbers in different drawings may identify the same or similar elements. The following detailed description does not limit the invention.

The evolution of mobile networks, such as Next Generation radio networks, towards Open Radio Access Networks (RANs) and virtualized RANs has gained momentum. Open RANs have the ability to integrate, deploy, and operate RANs using elements (e.g., components, subsystems, and software) which are sourced from multiple different vendors, are inter-operable, and can connect over open interfaces. Virtualized RANs involve the use of Network Functions Virtualization (NFV) and Software Defined Networks (SDNs) to virtualize a portion of the RAN onto standard Information Technology (IT) and Commercial Off-the-Shelf (COTS) hardware in a central location or in the cloud. Virtualized RANs offer a number advantages, including a flexible and scalable architecture that enables dynamic load-balancing, intelligent traffic steering, and latency reduction using local caching.

Next Generation mobile networks, through the use of network slicing, for example, are being designed to offer a variety of services that each demands a different network performance for different types of transport sessions. Exemplary embodiments described herein implement an intelligent radio controller that, in conjunction with multiple network distributed User Plane (UP) functions, enables the flexible routing and transport of traffic to satisfy different QoS and network slicing requirements associated with different types of network services and different types of traffic. Using, for example, NFV, different UP functions may be installed at different distributed locations throughout the network environment, such as in an edge cloud (e.g., a Multi-Access Edge Computing (MEC) cloud), in a centralized RAN (C-RAN), and/or in the core cloud. The intelligent radio controller selects one of the distributed UP functions within the network environment to satisfy network performance requirements for a particular transport session, such as latency or bandwidth requirements. The network performance requirements may be derived from a user profile of the particular user, and/or from the needs of a particular application or a particular network service. For example, a given application may require a maximum amount of end-to-end latency or a minimum amount of bandwidth. The intelligent radio controller additionally selects a particular distributed unit (DU) from multiple different DUs based on a performance profile associated with each DU, where the DUs implement a subset of wireless station functions associated with radio frequency (RF) communication with user equipment (UEs) and where each of the DUs connects to a respective radio unit (RU). The intelligent radio controller initiates data transport for the particular session to and/or from a UE via a transport path that includes the selected UP function and the selected DU.

FIG. 1A illustrates the implementation of a radio slice controller in an exemplary base station 100 of a wireless network (not shown). The base station 100 may, in one implementation, include a New Radio (NR) Next Generation gNodeB used in the Radio Access Network (RAN) of a Next Generation mobile network, such as, for example, a 5G mobile network. Base station 100 may include a central unit (CU) 105, at least one DU 110, and at least one radio unit (RU) 115. As shown, CU 105 may be divided into two subcomponents: a CU-Control Plane (CP) component 120 (referred to herein as "CU-CP 120") and a CU-User Plane (UP) component 125 (referred to herein as "CU-UP 125"). The CU-CP 120 includes a logical node that hosts Radio Resource Control (RRC), and other control plane, functions (e.g., Service Data Adaptation Protocol (SDAP), and Packet Data Convergence Protocol (PDCP)). The CU-CP 120 may additionally host a radio slice controller 130, as described further herein. Radio slice controller 130 selects a particular DU 110, and a particular CU-UP 125, for routing and transporting data to and from a UE for a given data session based on, for example, a performance profile associated with the DU 110, a user profile associated with the UE, and/or network performance requirements associated with the network service, application, or traffic involved in the data session.

The CU-UP 125 includes a logical node that hosts user plane functions, such as, for example, data routing and transport functions. As described in further detail below, CU-CP 120 and CU-UP 125 of CU 105 may include distributed nodes that may be located remotely from one another. As further described below, multiple distributed CU-CP 120s and/or multiple CU-UPs 125 may be positioned at different locations within a network (not shown). A selected one of the CU-CPs 120 and a selected one of the CU-UPs 125 may be used for handling traffic from one or more UEs (not shown).

The DU 110 of base station 100 may, in some implementations, include multiple DUs 110-1 through 110-n, where n is equal to or greater than 2. Each DU 110 of the multiple DUs includes a logical node that hosts functions associated with the Radio Link Control layer, the Medium Access Control (MAC) layer, and the physical layer (PHY). The RU 115 may include multiple RUs 115-1 through 115-n. Each RU 115 may include at least one radio transceiver, and associated antenna(s), for RF wireless communication with one or more user equipment (UEs) (not shown). Each DU 110 connects to a RU 115. For example, each DU of the multiple DUs 110-1 through 110-n connects to a respective one of RUs 115-1 through 115-n (e.g., DU 110-1 connects to RU 115-1, DU 110-2 connects to RU 115-2, etc.).

CU 105 controls the transport of data (e.g., data packets) received at a RU 115 via wireless RF transmissions from a UE (not shown), and controls the transport of data from the wireless network to a DU 110 and RU 115 for wireless transmission to a destination UE (not shown). UEs, as referred to herein, may include any type of electronic device having a wireless capability (e.g., a Radio Frequency (RF) transceiver) to communicate with the wireless network via a base station 100. Each of the UEs may include, for example, a computer (e.g., desktop, laptop, tablet, or wearable computer), a personal digital assistant (PDA), a "smart" phone, or a "Machine-to-Machine" (M2M) or "Internet of Things" (IoT) device. A "user" (not shown) may own, operate, and/or administer each UE.

Figure 1B:
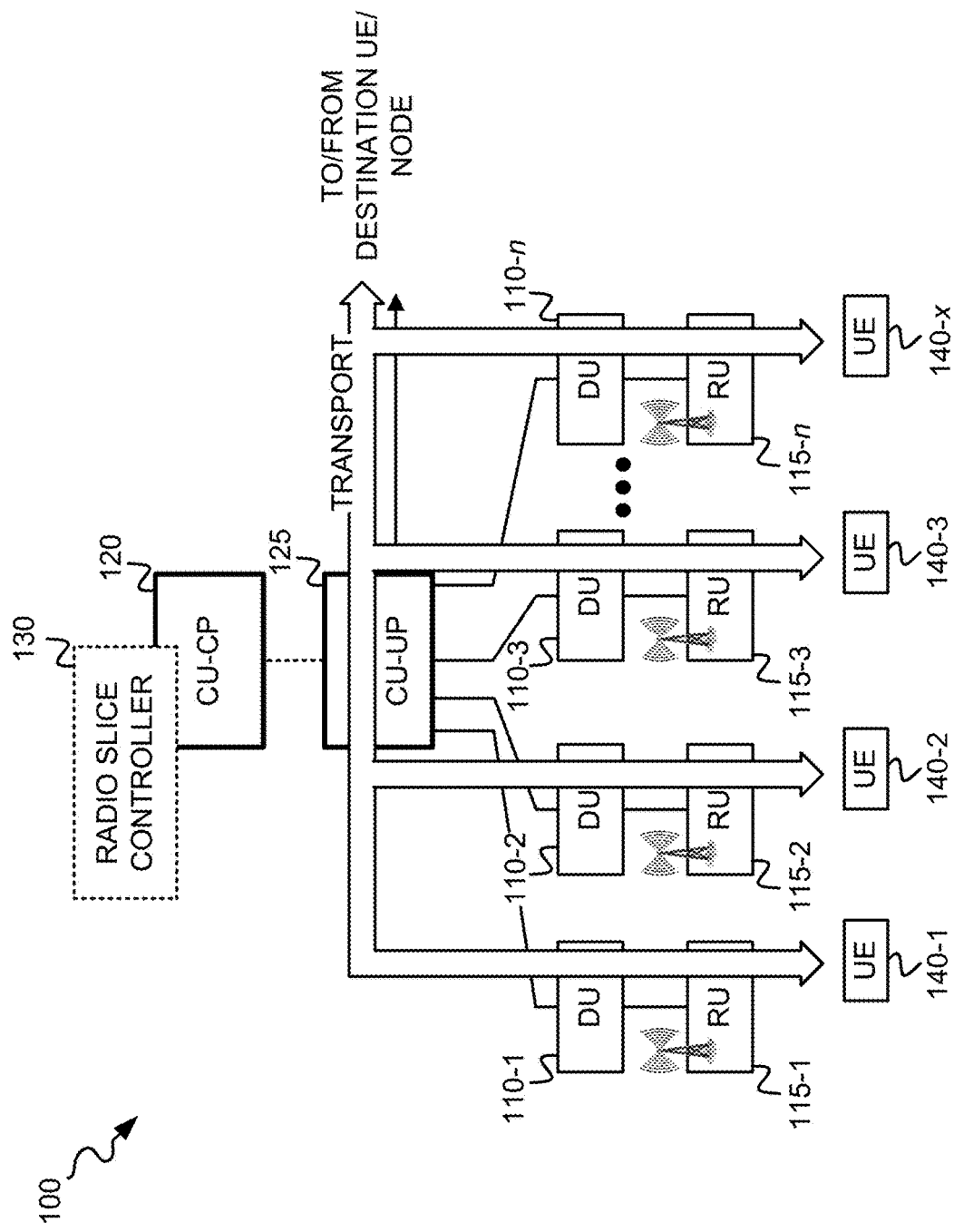
FIG. 1B illustrates examples of data transport to and from user equipment via a selected Control Unit-User Plane and a selected Distributed Unit.

FIG. 1B illustrates examples of data transport to and from UEs 140-1 through 140-x via a selected CU-UP 125 and a selected DU 110. For example, radio slice controller 130 of CU-CP 120 may select CU-UP 125 and DU 110-1 for data transport between UE 140-1 and a destination UE, or other destination network node (e.g., a server). As a further example, radio slice controller 130 of CU-CP 120 may select CU-UP 125 and DU 110-2 for data transport between UE 140-2 and a destination UE, or other destination network node. As an additional example, radio slice controller 130 of CU-CP 120 may select CU-UP 125 and DU 110-3 for data transport between UE 140-3 and a destination UE, or other destination network node. For a last example, radio slice controller 130 of CU-CP 120 may select CU-UP 125 and DU 110-n for data transport between UE 140-x and a destination UE, or other destination network node.

Figure 2A:
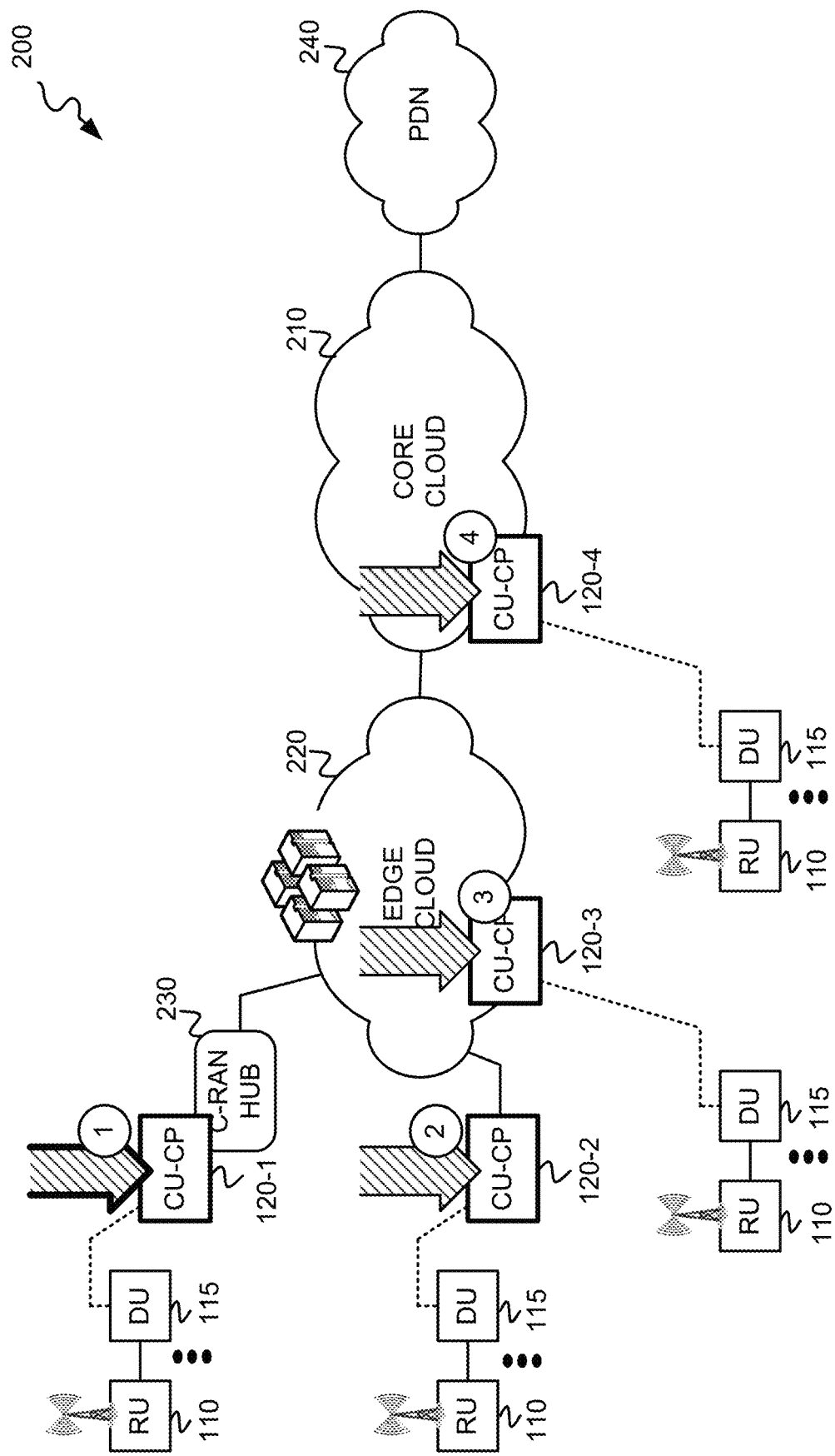
FIG. 2A illustrates an example of multiple different distributed locations within a network environment at which Control Unit-Control Planes may be installed to enable the handling of traffic from different applications or different network services that require different levels of network performance.

FIG. 2A illustrates an example of different distributed locations within a network environment 200 at which CU-CPs 120 may be installed to enable the handling of traffic from different applications, or different network services, that require different levels of network performance (e.g., different levels of latency sensitivity, or different levels of required bandwidth). Network environment 200 may include, for example, a core cloud 210, an edge cloud 220, a centralized Radio Access Network (C-RAN) hub 230, and a packet data network (PDN) 240. In other implementations, network environment 200 may include a different composition and/or configuration of inter-connected networks. For example, though only a single edge cloud 220 is shown in FIG. 2A, network environment 200 may include multiple edge clouds 220 connected to core cloud 210 and/or PDN 240.

Core cloud 210 includes the core components of a wireless network that serves to provide wireless access to subscribing UEs (not shown). The wireless network may include any type of wireless network that provides wireless access and connectivity to UEs. The wireless network may include, for example, a Public Land Mobile Network (PLMN) or a satellite network. In the case of a 5G wireless network, the core components may include, among other components, an Access and Mobility Management Function (AMF), a Session Management Function (SMF), and core-implemented user plane (UP) functions. In the case of a 4G wireless network, or other types of wireless networks, core cloud 210 may include different core components that possibly perform different functions than the components of a 5G wireless network.

Edge cloud 220 includes one or more edge computing data centers, or other edge devices, that enable the movement of traffic and network services from core cloud 210 towards the edge of network environment 200 and closer to the destination devices (e.g., UEs). Instead of sending data to core cloud 210 for processing, routing, and transport, edge cloud 220 includes components that handle the data closer to the destination devices, thereby reducing latency. Edge Cloud 220 may include, for example, a Multi-Access Edge Computing (MEC) network. Though not shown in FIG. 2A, edge cloud 220 may connect to PDN 240 in addition to connecting to core cloud 210.

C-RAN hub 230 may include a centralized office "hotel" at which multiple CU-CPs 120 are located to enable efficient and cost-effective network access. C-RAN hub 230 may connect to edge cloud 220, as shown in FIG. 2A, or, in other implementations, may connect to core cloud 210 and/or to PDN 240.

PDN 240 may include any type of packet-switching network(s) that can connect to core cloud 210 for transporting data to and from nodes that are external to core cloud 210. PDN 240 may include, for example, the Internet, a local area network(s) (LAN), a wide area network(s) (WAN), or a metropolitan area network (MAN). In one example, one or more servers may be connected to PDN 240 and may engage in data transport with a UE (not shown) via PDN 240 and core cloud 210.

As shown in FIG. 2A, a CU-CP 120 may be located at various locations within network environment 200 based on, among other factors, the different network performance requirements (e.g., latency requirements) of the particular applications being executed at the UEs. For example, a CU-CP 120-1 may be located (identified with a "1" within a circle) at C-RAN hub 230, a CU-CP 120-2 may be located in a stand-alone device (identified with a "2" within a circle) having a link to edge cloud 220, a CU-CP 120-3 may be located within edge cloud 220 (identified with a "3" within a circle), and/or a CU-CP 120-4 may be located in core cloud 210 (identified with a "4" within a circle). At locations 1 and 2, CU-CP 125-1 may be co-located or integrated with one or more DUs 115 (e.g., to reduce latency for latency sensitive applications). At location 3, CU-CP 125-3 may be co-located or integrated with Multi-access Edge Computing (MEC) devices. At location 4, CU-CP 125-4 may be integrated with core cloud 210, or hosted by components of core cloud 210.

Figure 2B:
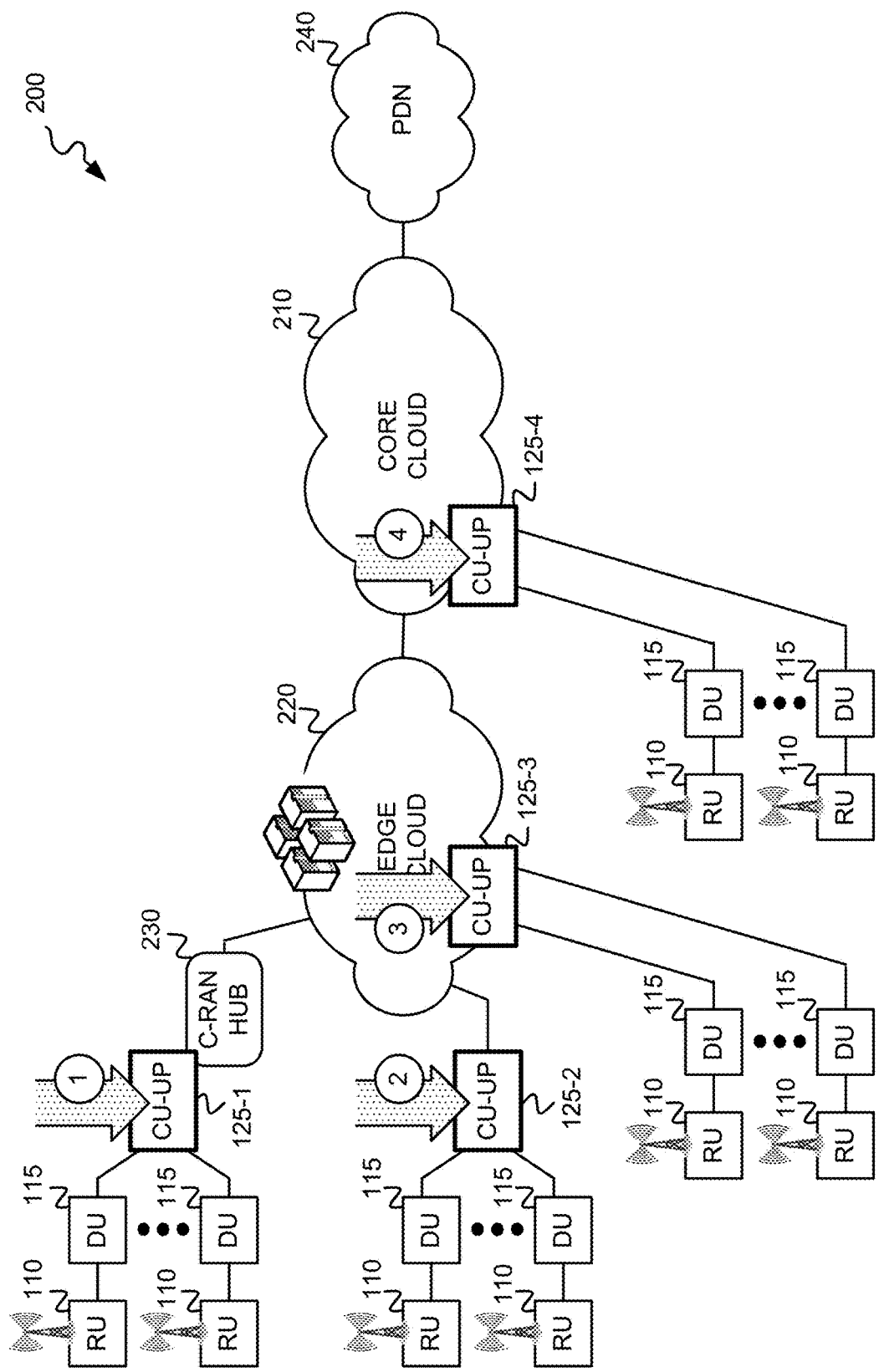
FIG. 2B illustrates an example of multiple different distributed locations within the network environment of FIG. 2A at which Control Unit-User Planes may be positioned for the routing and transport of traffic from different user equipment applications having different levels of latency sensitivity.

FIG. 2B illustrates an example of different distributed locations within the network environment 200 of FIG. 2A at which CU-UPs 125 may be positioned for the routing and transport of traffic from different UE applications having different levels of latency sensitivity. As shown in FIG. 2B, CU-UPs 125 may be positioned (e.g., using NFV) at various different locations within network environment 200 and then selected for use during data routing and transport, by radio slice controller 130, based on the different network performance requirements (e.g., latency requirements) of the particular applications being executed at the UEs. In some implementations, the CU-UPs 125 may be positioned in network environment 200 independently of the locations of the CU-CPs 120 shown in FIG. 2A. In other implementations, each of the CU-UP 125s may be positioned in network environment 200 at certain locations relative to its controlling CU-CP 120 to ensure a particular level of latency.

As shown in FIG. 2B, a CU-UP 125-1 may be located (identified with a "1" within a circle) at C-RAN hub 230, with one or more co-located DUs 115, to ensure an ultra-low transport latency (e.g., less than about 20 milliseconds (ms)). Further, a CU-UP 125-2 may be located in a stand-alone device (identified with a "2" within a circle) having a link to edge cloud 220, and co-located with one or more DUs 115, to ensure an ultra-low transport latency. Additionally, a CU-UP 125-3 may be located (identified with a "3" within a circle) in edge cloud 220, with a connection to either one or more DUs 115 at C-RAN hub 230 or one or more DUs 115 connected to edge cloud 220. Locating CU-UP 125-3 at the location identified with a "3" ensures a low transport latency (e.g., less than about 50 ms). Furthermore, a CU-UP 125-4 may be located in core cloud 210 (identified with a "4" within a circle), with a connection to one or more DUs 115 at C-RAN hub 230, one or more DUs 115 connected to edge cloud 220, or one or more DUs 115 connected to core cloud 210. Location of the CU-UP 125-4 in core cloud 210 ensures a normal transport latency.

Figure 3A:
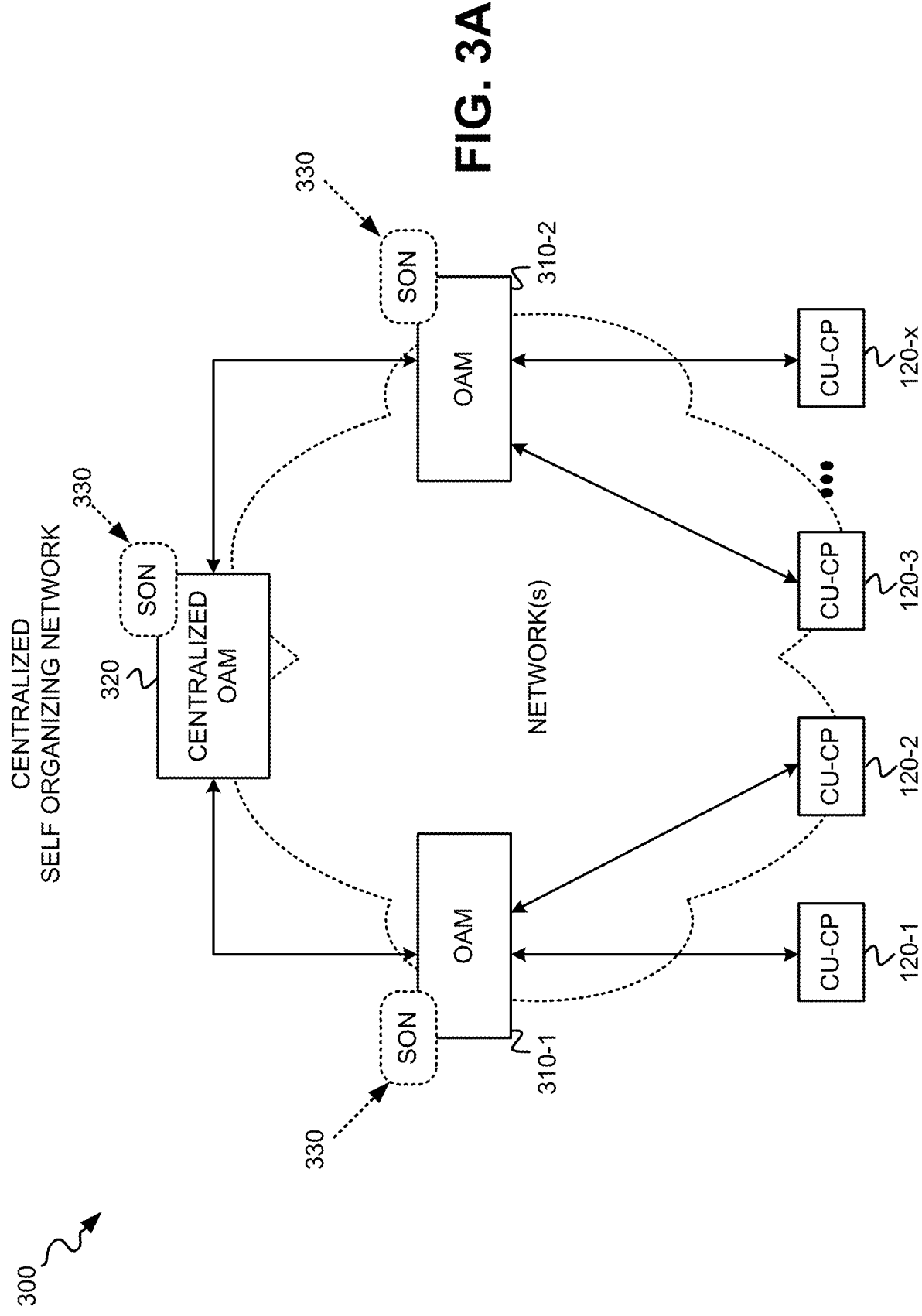
FIGS. 3A and 3B illustrate examples of self-organizing networks that may be implemented in the network environment of FIG. 2A.
Figure 3B:
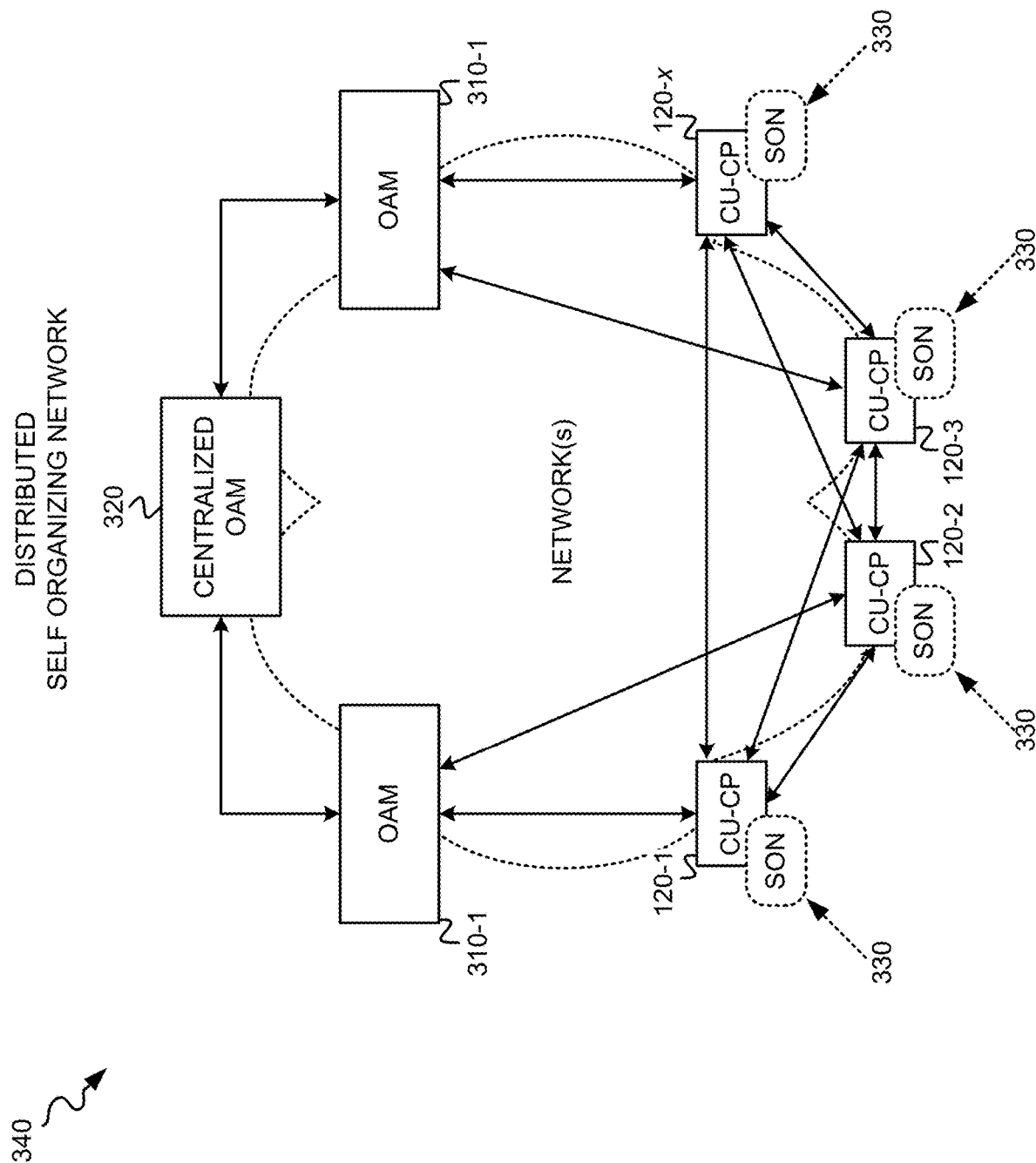

FIGS. 3A and 3B illustrate examples of self-organizing networks (SONs) that may be implemented in the network environment 200 of FIG. 2A. A SON may include an automated system that configures, manages, optimizes, and heals mobile RANs quickly and dynamically. SONs may be arranged in various types of configurations including, for example, centralized SONs, and distributed SONs. FIG. 3A depicts an example of a centralized SON 300 that incorporates CU-CPs 120 of the network environment 200 of FIG. 2A, and FIG. 3B depicts an example of a distributed SON 340 that also incorporates CU-CPs 120 of the network environment 200 of FIG. 2A.

As shown in FIG. 3A, centralized SON 300 includes CU-CPs 120-1 through 120-x, Operations, Administration, and Maintenance (OAM) nodes 310-1 through 310-2, and a centralized OAM node 330. In the centralized SON 300 of FIG. 3A, each of OAM nodes 310-1 and 310-2, and centralized OAM node 320, may execute SON functionality 330. OAM nodes 310-1 and 320-2, and centralized OAM node 320, may additionally execute network management/administration functions that provide network fault indication, fault localization, network performance, and network analysis and diagnosis functions. SON functionality 330 may perform various different types of SON sub-functions based on the data provided by the network management/administration functions of centralized OAM node 320 and/or OAM nodes 310.

The sub-functions of SON 330 may include, for example, a self-configuration sub-function, a self-optimization sub-function, a self-healing sub-function, and/or a self-protection sub-function, for automatically organizing and operating the components of the wireless network. The self-configuration sub-function may automatically configure and integrate new base stations 100 into the wireless network. The self-configuration sub-function may automatically adjust technical parameters, such as emission power, antenna orientation, etc., of base stations 100 based on changes in the network configuration (e.g., addition of a new base station 100, addition of a new DU 110, and failure of a DU 110 or RU 115) so as to provide a certain coverage and capacity. The self-optimization sub-function may automatically adjust base station 100 parameters to optimize performance of the wireless network. The self-healing sub-function may automatically identify failing network nodes and adjust the operation of adjacent nodes so that the adjacent nodes can support the users that were supported by the failing node. The self-protection sub-function may automatically defend the nodes of the wireless network from penetration by any unauthorized user.

As shown in FIG. 3B, the distributed SON 340 also includes CU-CPs 120-1 through 120-x, OAM nodes 310-1 through 310-2, and a centralized OAM node 320. However, in the distributed SON 340, SON functionality 330 may be implemented at each of the CU-CPs 120-1 through 120-x, instead of at the OAM nodes 310 or 320. Implementation of the SON functionality 330 at each of the CU-CPs 120 enables localization of control based on network data provided by the network management/administration functions of OAM nodes 310 and/or 320.

Figure 4:
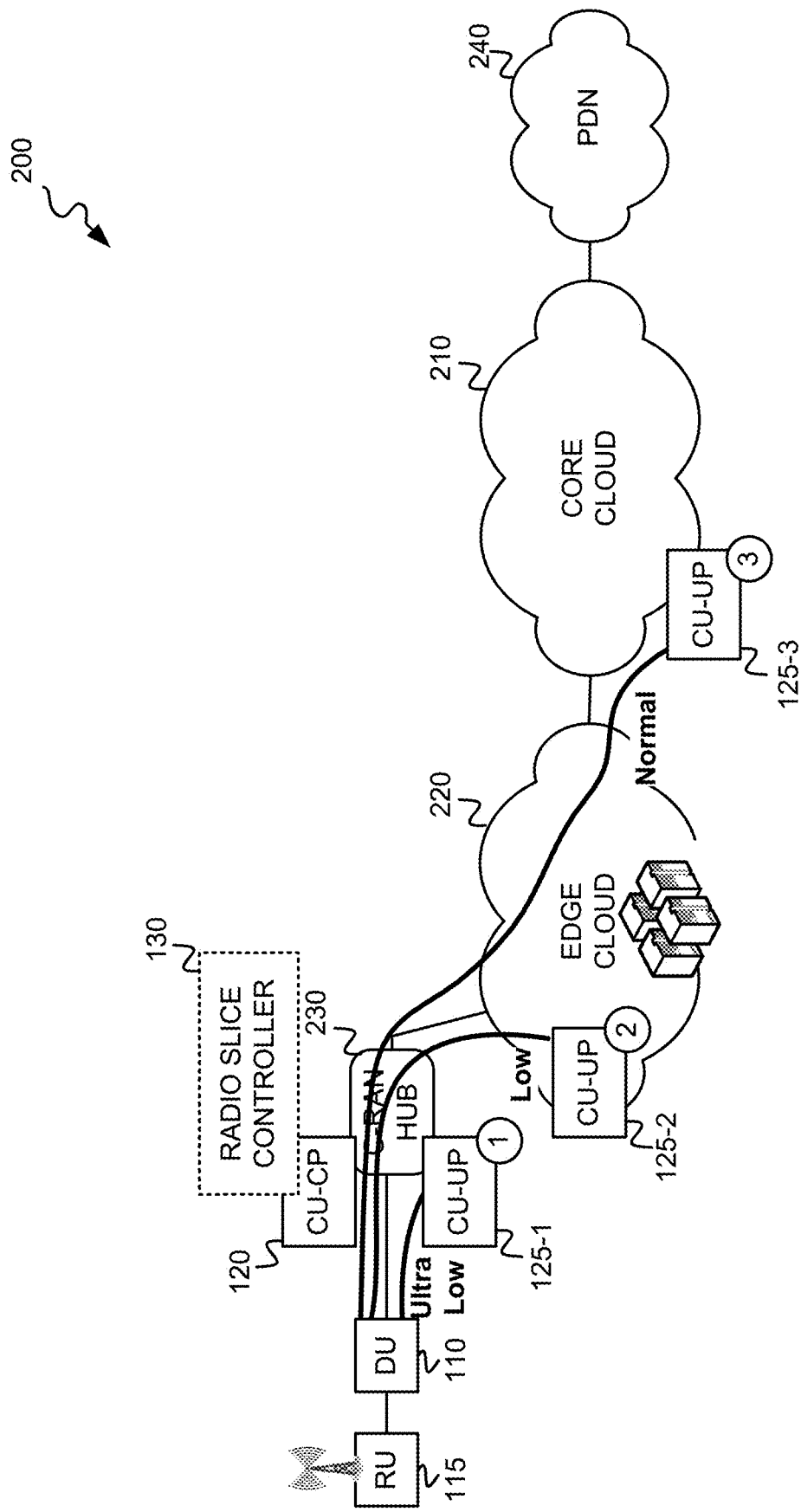
FIG. 4 illustrates an example of latencies associated with data transport to/from a user equipment via a C-RAN hub that is connected to an edge cloud.

FIG. 4 illustrates an example of potential latencies associated with data transport to/from a UE (not shown) via a C-RAN hub 230 that is connected to edge cloud 220. In the example shown, CU-CP 120 is located in C-RAN hub 230, and multiple CU-UPs 125-1, 125-2, and 125-3 are distributed across the network environment 200 for selection, by radio slice controller 130 at CU-CP 120, for routing and transport. Radio slice controller 130, at CU-CP 120, may select one of CU-UPs 125-1, 125-2, and 125-3 based on the transport performance required by the user profile of the UE, and/or required by the service or application, associated with the traffic. As shown, CU-UP 125-1 is located at C-RAN hub 230 and co-located with one or more DUs 110, CU-UP 125-2 is located within edge cloud 220, and CU-UP is located within core cloud 210. For ultra-low latency transport between a UE (not shown) and a destination device, CU-CP 120 may select CU-UP 125-1 at C-RAN hub 230 for routing and transporting the UE data traffic. For low latency transport, CU-CP 120 may select CU-UP 125-2 in edge cloud 220 for routing and transporting UE data traffic. For normal latency transport, CU-CP 120 may select CU-UP 125-3 in core cloud 210 for routing and transporting UE data traffic.

Figure 5:
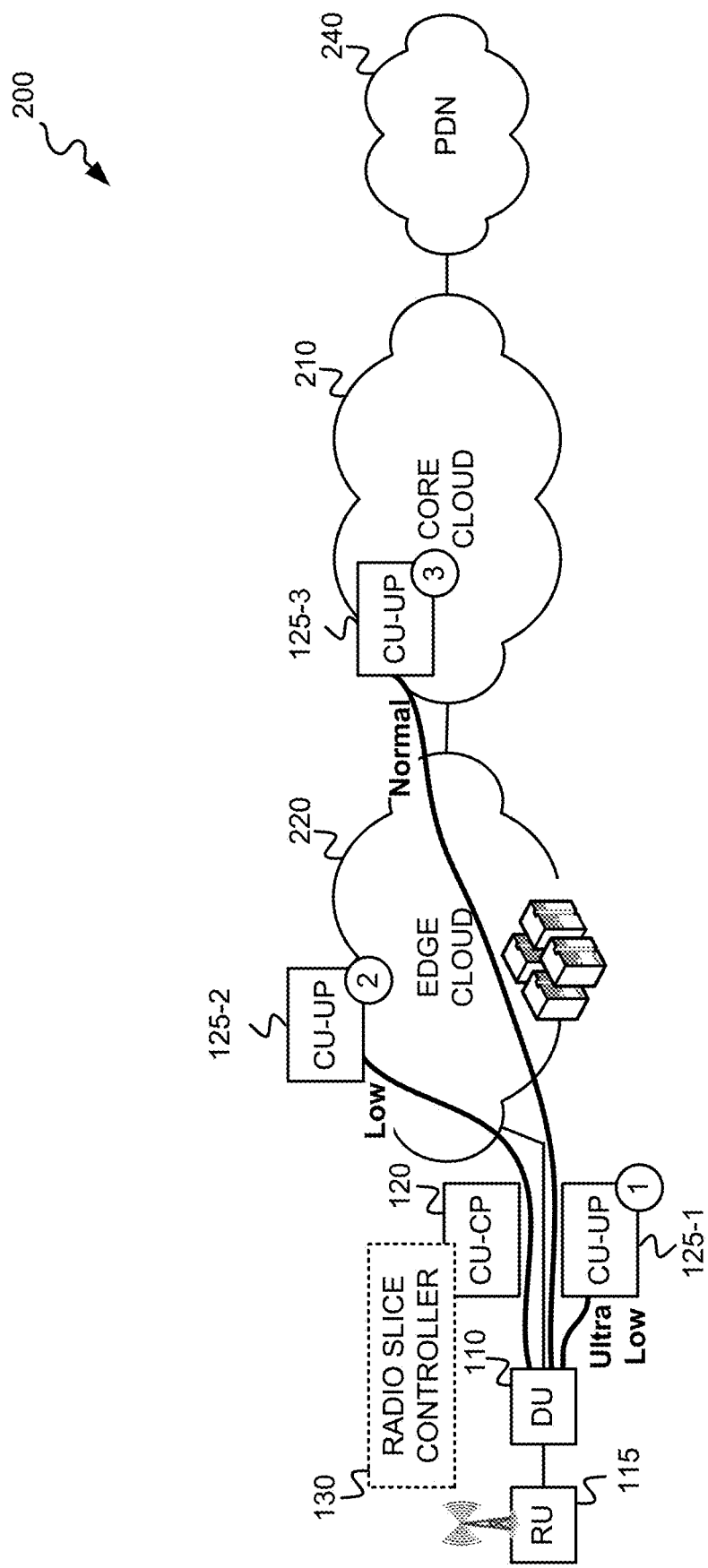
FIG. 5 illustrates an example of transport latencies associated with data transport to/from a user equipment via an edge cloud.

FIG. 5 illustrates an example of potential transport latencies associated with data transport to/from a UE (not shown) via edge cloud 220. In the example shown, CU-CP 120 is hosted by a stand-alone device connected to edge cloud 220, and CU-UPs 125-1, 125-2 and 125-3 are distributed across the network environment 200 for selection for routing and transport. In the example of FIG. 5, radio slice controller 130, at CU-CP 120, may select one of CU-UPs 125-1, 125-2, and 125-3 based on the transport performance required by the user profile of the UE, and/or required by the service or application, associated with the transported traffic. As shown, CU-UP 125-1 is located at the stand-alone device with CU-CP 120 and co-located with one or more DUs 110. CU-UP 125-2 is located in edge cloud 220, and CU-UP 125-3 is located in core cloud 210. For ultra-low latency transport between a UE (not shown) and another UE or device, CU-CP 120 may select CU-UP 125-1, connected to edge cloud 220, for routing and transporting the UE data traffic. For low latency transport, CU-CP 120 may instead select CU-UP 125-2 in edge cloud 220 for routing and transporting UE data traffic. For normal latency transport, CU-CP 120 may select CU-UP 125-3 in core cloud 210 for routing and transporting UE data traffic.

Figure 6:
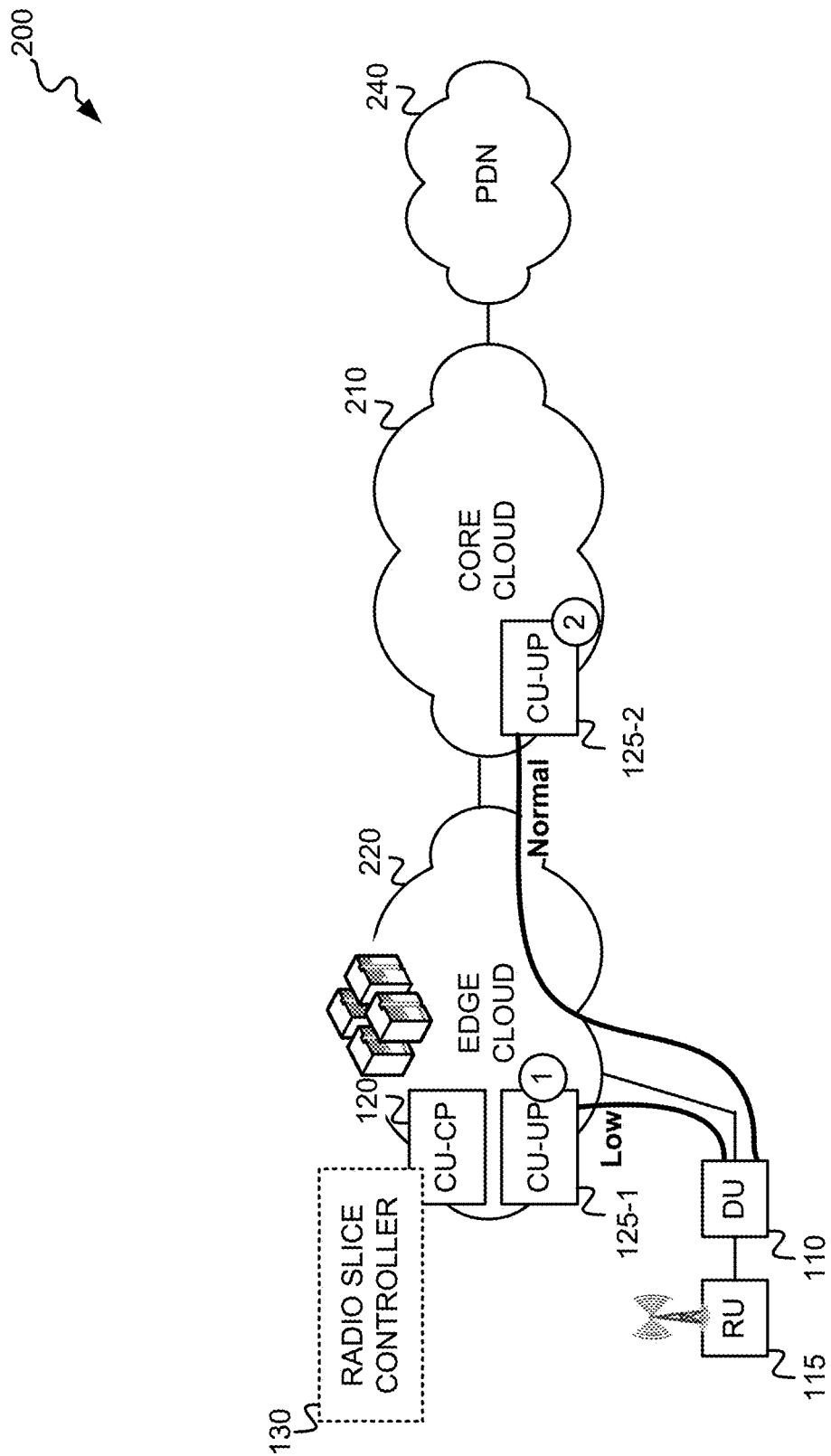
FIG. 6 illustrates an example of latencies associated with data transport to/from a user equipment via an edge cloud, where the Control Unit-Control Plane and Control Unit-User Plane functions are not co-located with the one or more distributed units involved in the data transport.

FIG. 6 illustrates an example of potential latencies associated with data transport to/from a UE (not shown) via edge cloud 220, where CU-CP 120 and CU-UP 125 are not co-located with the one or more DUs 110 involved in the data transport. In the example shown, CU-CP 120 is located in edge cloud 220 and CU-UPs 125-1 and 125-2 are distributed across the network environment 200 for selection, by radio slice controller 130 at CU-CP 120, for routing and transport. Radio slice controller 130, at CU-CP 120, may select one of CU-UPs 125-1 and 125-2 based on the transport performance required by the user profile of the UE, and/or required by the service or application, associated with the transported traffic. As shown, CU-UP 125-1 is located in edge cloud 220 and CU-UP 125-2 is located in core cloud 210. For low latency transport between a UE (not shown) and a destination UE/device, CU-CP 120 may select CU-UP 125-1 in edge cloud 220 for routing and transporting UE data traffic. For normal latency transport, CU-CP 120 may select CU-UP 125-2 in core cloud 210 for routing and transporting UE data traffic.

Figure 7:
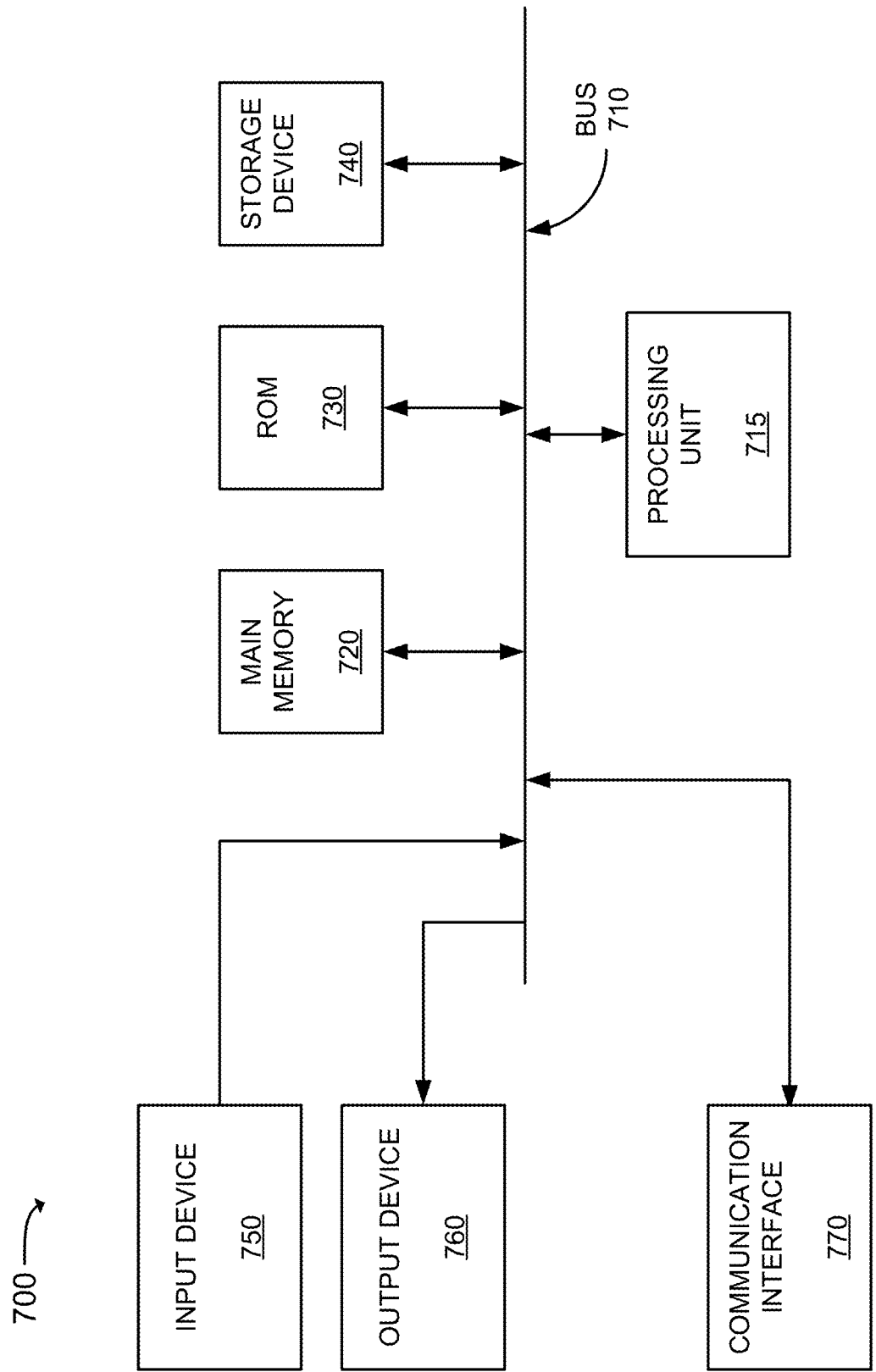
FIG. 7 is a diagram of exemplary components of a device that may execute functions of a Control Unit-Control Plane, Control Unit-User Plane, a distributed unit, a radio unit, and/or an Operations, Administration, and Maintenance node.

FIG. 7 is a diagram of exemplary components of a device 700. Device 700 may execute functions of a CU-CP 120, a radio slice controller 130 of a CU-CP 120, a CU-UP 125, a DU 110, a RU 115 and/or an OAM node 310 or 320. Device 700 may additionally execute functions of C-RAN hub 230, or the data center(s) or device(s) of edge cloud 220. Device 700 may further execute core network functions (e.g., AMF, SMF, etc.) of core cloud 210.

Device 700 may include a bus 710, a processing unit 715, a main memory 720, a read only memory (ROM) 730, a storage device 740, an input device 750, an output device 760, and a communication interface 770. Bus 710 may include a path that permits communication among the elements of device 700.

Processing unit 715 may include one or more processors or microprocessors which may interpret or execute stored instructions associated with one or more processes, or processing logic that implements the one or more processes. For example, in one implementation, processing unit 715 may include, but is not limited to, programmable logic such as Field Programmable Gate Arrays (FPGAs) or accelerators. Processing unit 715 may include software, hardware, or a combination of software and hardware for executing the processes described herein. Main memory 720 may include a random access memory (RAM) or another type of dynamic storage device that may store information and, in some implementations, instructions for execution by processing unit 715. ROM 730 may include a Read Only Memory (ROM) device or another type of static storage device (e.g., Electrically Erasable Programmable ROM (EEPROM)) that may store static information and, in some implementations, instructions for use by processing unit 715. Storage device 740 may include a magnetic and/or optical recording medium and its corresponding drive. Main memory 720, ROM 730 and storage device 740 may each be referred to herein as a "non-transitory computer-readable medium" or a "non-transitory storage medium."

Input device 750 may include one or more devices that permit a user or operator to input information to device 700, such as, for example, a keypad or a keyboard, a display with a touch sensitive panel, voice recognition and/or biometric mechanisms, etc. Output device 760 may include one or more devices that output information to the operator or user, including a display, a speaker, etc. Input device 760 and output device 760 may, in some implementations, be implemented as a graphical user interface (GUI) that displays GUI information and which receives user input via the GUI. In some implementations, such as when device 700 executes functions of a CU-UP 125, input device 750 and/or output device 760 may be omitted from device 700.

Communication interface 770 may include one or more transceivers that enable device 700 to communicate with other devices and/or systems. For example, in the case where device 700 hosts the functions of a CU-CP 120 or a CU-UP 125, communication interface 770 may include a wired transceiver for communicating with other nodes via a wired network, such as, for example, via edge cloud 220, core cloud 210, or PDN 240. In implementations in which network device 700 executes the functions of a DU 115, communication interface 770 may include one or more optical transceivers for communicating with a RU 110 via optical fiber.

Device 700 may perform certain operations or processes, as may be described herein. Device 700 may perform these operations in response to processing unit 715 executing software instructions contained in a computer-readable medium, such as memory 720. A computer-readable medium may be defined as a physical or logical memory device. A logical memory device may include memory space within a single physical memory device or spread across multiple physical memory devices. The software instructions may be read into main memory 720 from another computer-readable medium, such as storage device 740, or from another device via communication interface(s) 770. The software instructions contained in main memory 720 may cause processing unit 715 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of device 700 illustrated in FIG. 7 is for illustrative purposes only. Other configurations may be implemented. Therefore, device 700 may include additional, fewer and/or different components, arranged in a different configuration, than depicted in FIG. 7.

Figure 8A:
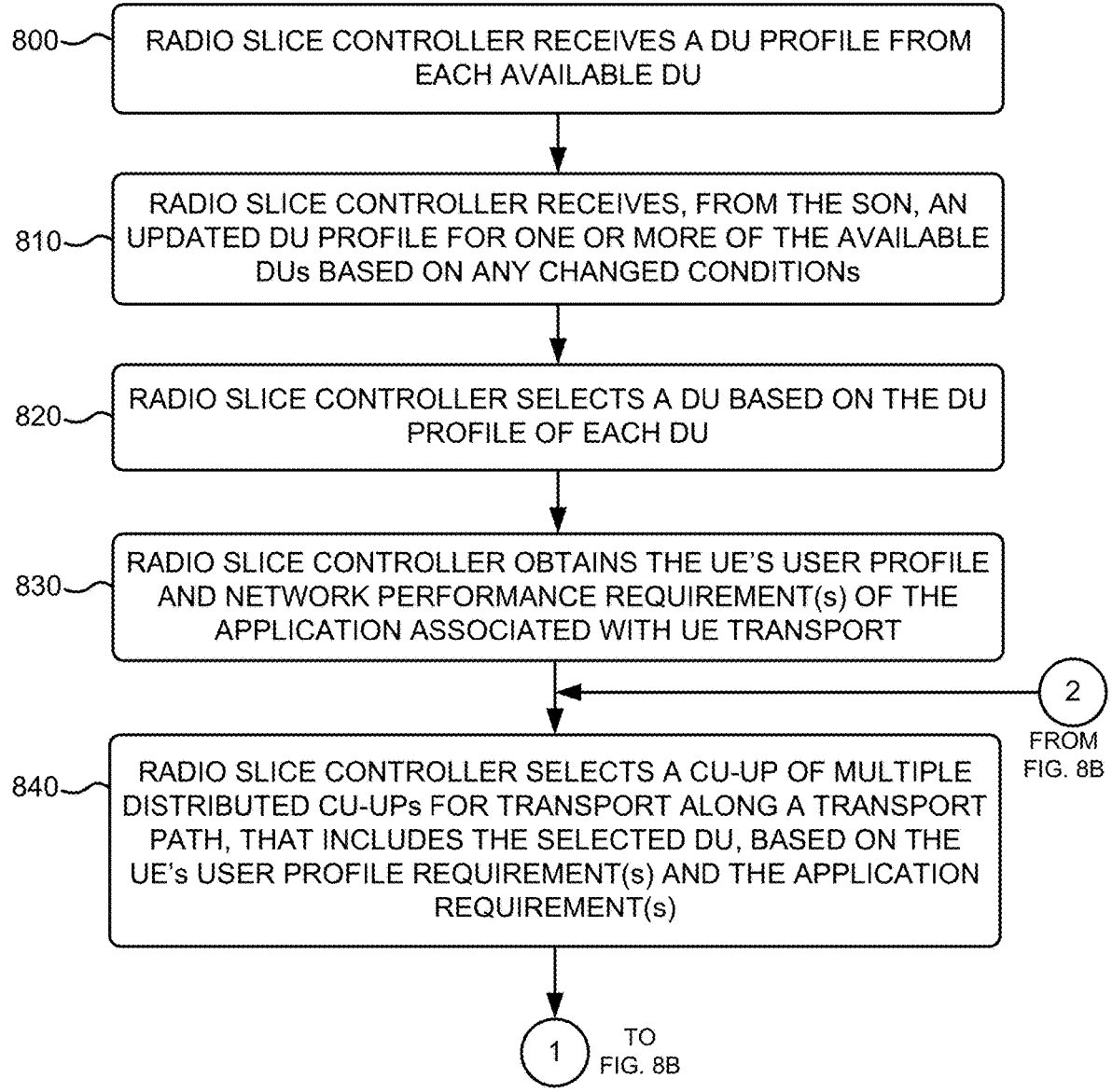
FIGS. 8A and 8B are flow diagrams of an exemplary process for distributed unit and Control Unit-User Plane function selection for establishing a transport path to/from a user equipment.
Figure 8B:
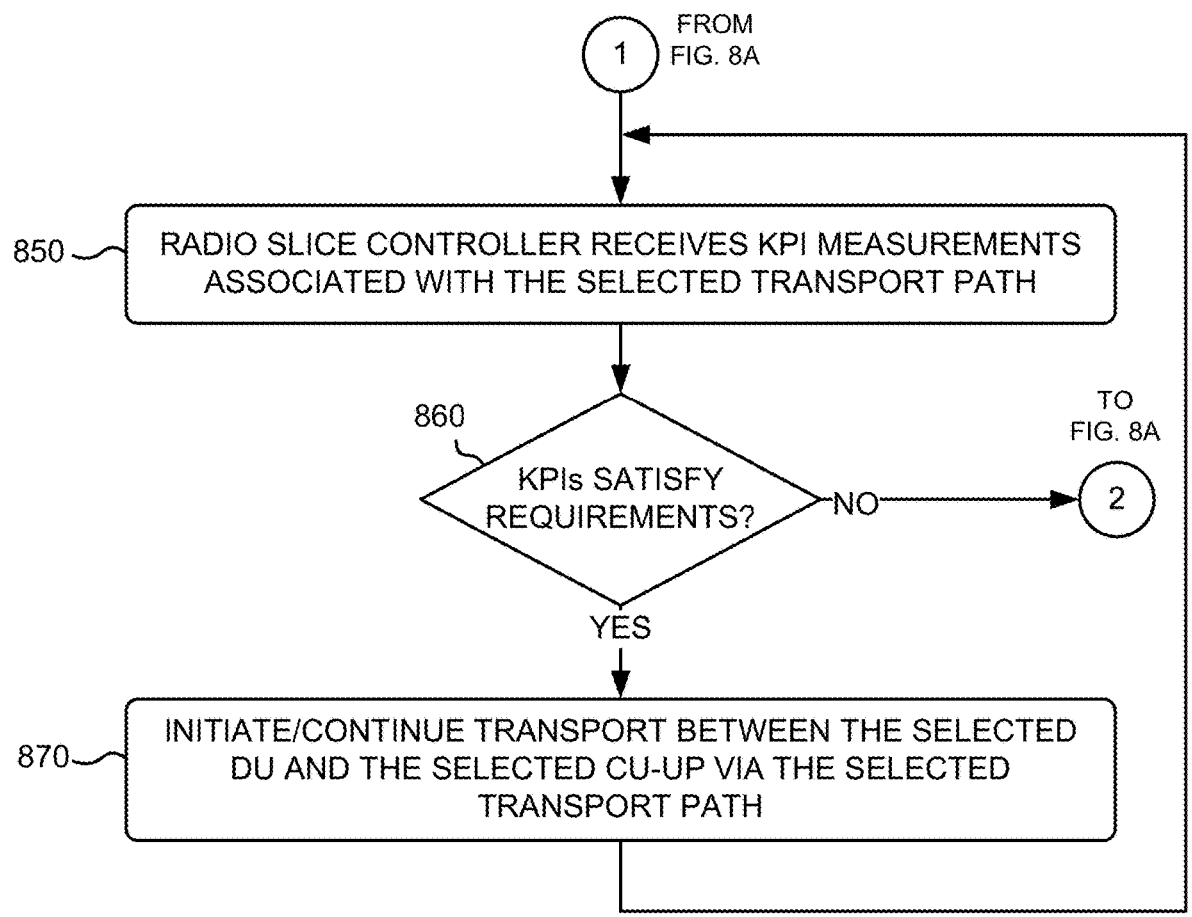

FIGS. 8A and 8B are flow diagrams of an exemplary process for DU 110 and CU-UP 125 selection for establishing a transport path to/from a UE 140 based on a UE's user profile and on the network performance requirements of the UE application. The exemplary process of FIGS. 8A and 8B may be implemented by a radio slice controller 130 of a CU-CP 120. Prior to execution of the process of FIGS. 8A and 8B, CU-UPs 125 are installed across the network environment 200 at different distributed locations using, for example, NFV. One example of the distribution of instances of CU-UPs 125 at different locations across the network environment 200 is shown in FIG. 2B. The instances of CU-UPs 125 may, however, be installed at different locations within network environment 200 than those shown in FIG. 2B.

The exemplary process includes radio slice controller 130 receiving a DU profile from each available DU 110 (block 800-FIG. 8A). The DU profile is generated by each DU 110 based on the slice identifier (ID), the Quality of Service (QoS) Flow Identifier (QFI), and/or the Fifth Generation QoS ID (5QI) associated with its bearer(s). Each DU 110 may support one or more channels (i.e., bearers) for communicating wirelessly with UEs, and each channel of each DU 110 may be associated with a particular slice ID, a particular QFI, and/or a particular 5QI. For each bearer, the DU 110 determines one or more minimum performance requirements that need to be satisfied to support the particular slice ID, QFI, and/or 5QI of that bearer. For example, the DU 110 may determine a minimum bandwidth, a minimum throughput, a maximum latency, and/or a maximum bit error rate needed to support a particular slice ID, QFI, and/or 5QI associated with a certain DU bearer. As an example, a DU 110 may determine that a particular slice ID, or a particular QFI, of a bearer requires a maximum latency of 50 milliseconds. Upon determination of the network performance parameters for each bearer, the DU 110 generates a DU profile that includes the one or more network performance parameters needed to support the particular slice ID, QFI, and/or 5QI of the bearer(s), and provides the created DU profile to the radio slice controller 130 of the CU-CP 120. For example, if the DU 110 determines that a particular slice ID requires a maximum latency of 30 ms, then the DU 110 creates a DU profile that specifies the 30 ms maximum latency requirement and sends the DU profile to the radio slice controller 130.

Radio slice controller 130 receives, from the SON, an updated DU performance profile for one or more of the available DUs 110 based on any changed conditions (block 810). The SON, shown in FIG. 3A or 3B, may determine the current configuration of the network, including a current status of DUs 110, a current network slice ID, QFI and/or 5QI of each DU 110, and may determine what are the minimum and maximum network performance parameters that may be supported when transporting data traffic based on the current network configuration. The SON may provide the updated network configuration information, and/or updated DU profiles for the DUs 110, to radio slice controller 130.

Radio Slice controller 130 selects a DU 110, from the available DUs 110, based on the DU profile of each DU 110 (block 820). Radio slice controller 130 determines which DU's can provide a sufficient network performance (e.g., sufficient bandwidth, throughput, latency, and/or error rate), as determined from each DU's DU profile, and selects one of the determined DUs.

Radio slice controller 130 obtains the UE's user profile, and network performance requirement(s) of the application associated with the UE transport (block 830). The CU-CP 120 hosting radio slice controller 130 may control traffic to and from a particular UE 140 that is communicating via the wireless network using a particular application. The UE 140 may have a user profile associated with UE 140, and the particular application may require a certain level of network performance. For example, the application may be a Voice over Internet Protocol (VoIP) application, and the VoIP application may require a certain maximum latency, and a certain maximum error rate, on the transport path to ensure a sufficient VoIP call quality. As another example, the application may be a massively multiplayer online (MMO) game that may require a minimum bandwidth, a maximum latency, and a maximum packet loss to ensure the quality of the gaming session.

Radio slice controller 130 selects a CU-UP 125 of multiple distributed CU-UPs 125 for transport along a transport path, that includes the selected DU, based on the UE's user profile and the application network performance requirement(s) (block 840). As described above with respect to FIGS. 2B and 4-6, the location of CU-UP 125 within the network environment 200 affects performance parameters associated with transport such as, for example, transport latency and control latency (affecting control signaling between CU-CP 120 and CU-UP 125). For UE user profiles and application network performance requirements that do not require low latency transport, radio slice controller 130 may select a CU-UP 125 that is positioned in core cloud 210 for processing and routing the traffic to/from the UE. If, however, the DU 110 selected for a particular UE transport session is connected to a C-RAN hub 230, and the UE's user profile and/or application network performance requirements require a very low latency, then radio slice controller 130 may select a CU-UP 125 positioned in C-RAN hub 230 for processing and routing the traffic to/from the UE.

Radio slice controller 130 receives key performance indicator (KPI) measurements associated with the chosen data path (block 850)(FIG. 8B). OAMs 310/320 of the SON may monitor KPI measurements, such as bandwidth, latency, throughput, or packet loss measurements, associated with the areas of the network environment 200 through which the transport path passes. For example, referring to FIG. 4, if the serving DU 110 is connected to C-RAN hub 230, and the serving CU-UP 125-2 is located in edge cloud 220, then the SON OAMs 310/320 may monitor KPI measurements associated with traffic through C-RAN hub 230 and edge cloud 220. As another example, referring to FIG. 5, if the serving DU 110 is connected to edge cloud 220, and the serving CU-UP 125-3 is located in core cloud 210, then the SON OAMs 310/320 may monitor KPI measurements associated with traffic through edge cloud 220 and core cloud 210.

Radio slice controller 130 determines if the KPI measurements satisfy the user profile requirements and the application requirements (block 860). Radio slice controller 130 compares the KPI measurement data, received from the SON, with the requirements of the UE's user profile and/or the application to determine if the network performance, across the chosen transport path, is sufficient to satisfy the user profile requirements and/or the application requirements.

If the KPI measurements indicate that the network performance via the selected transport path does not satisfy either the user profile requirements or the application requirements (NO—block 860), then the exemplary process may return to block 840 (FIG. 8A), with radio slice controller 130 selecting a different transport path, including a different CU-UP 125, for transport based on the UE's user profile requirements and the application requirements.

If the KPI measurements indicate that the network performance via the selected transport path satisfies both of the user profile requirements and the application requirements (YES—block 860), then radio slice controller 130 initiates transport between the chosen DU 110 and the chosen CU-UP 125 via the chosen transport path (block 870). During transport to/from the UE via the selected data path that includes the selected DU 110 and the selected CU-UP 125, radio slice controller 130 may receive KPI measurement updates associated with the chosen transport path (e.g., block 850). Transport over the selected transport path continues, during the UE's transport session, if radio slice controller 130 determines that the measured KPIs indicate that the network performance via the path satisfies both the user profile requirements and the application requirements (e.g., YES—block 860). If, however, radio slice controller 130 determines that the measured KPIs do not satisfy either the user profile requirements or the application requirements (e.g., NO—block 860), then the exemplary process may return to block 840 (FIG. 8A), with radio slice controller 130 selecting a different data path, including a different CU-UP 125, for transport, during the existing UE transport session, based on the UE's user profile requirements and the application requirements. The KPIs of the selected transport path may be continuously, or periodically, monitored, at blocks 850 and 860, to ensure that the network performance over the transport path continues to satisfy the user profile requirement(s) and the application requirement(s) for the duration of the UE's transport session.

Though not shown in FIGS. 8A and 8B, blocks 800, 810, and 820 may be executed continuously, or periodically, in parallel with other blocks of the process of FIGS. 8A and 8B to update the DU profiles, and/or network configuration information, and re-select a DU 110 based on the updated DU profiles.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIGS. 8A and 8B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
distributing, using Network Functions Virtualization (NFV), multiple Control Unit-User Plane functions (CU-UPs) at multiple different locations within, or connected to, a centralized Radio Access Network (C-RAN), a Multi-Access Edge Computing (MEC) cloud, and a mobile core cloud;
using self-organizing network (SON) functionality to organize and configure the multiple CU-UPs, a plurality of distributed units (DUs), and at least one Control Unit-Control Plane function (CU-CP) as a SON, wherein each of the plurality of DUs are connected to at least one of the C-RAN, the MEC cloud, or the mobile core cloud;
receiving, from the SON, SON configuration information and performance parameters associated with the plurality of DUs;
selecting a first DU of the plurality of DUs based on the received SON configuration information and the performance parameters associated with the plurality of DUs;
obtaining at least one network performance requirement of an application or network service associated with transport involving a user equipment device (UE);
selecting a first CU-UP of the multiple CU-UPs, having a location that is within, or connected to, a selected one of the C-RAN, the MEC cloud, or the mobile core cloud, for the transport along a first transport path that includes the selected DU, based on the at least one network performance requirement of the application or network service; and initiating the transport, involving the UE via the selected first DU and the selected first CU-UP, over the first transport path.

2. The method of claim 1, further comprising:

receiving, from a network management system of the SON, key performance indicator (KPI) measurements associated with the first transport path;

determining if the KPI measurements associated with the first transport path satisfy the at least one network performance requirement of the application or network service;

selecting, when the KPI measurements do not satisfy the at least one network performance requirement of the application or network service, a second CU-UP of the multiple CU-UPs for the transport along a second transport path that includes the selected DU, based on the the at least one network performance requirement of the application or network service; and initiating the transport, involving the UE via the selected first DU and the selected second CU-UP, over the second transport path.

3. The method of claim 1, wherein the at least one network performance requirement comprises a maximum transport latency of the first transport path.

4. The method of claim 1, further comprising:

obtaining a user profile associated with the UE, wherein the user profile specifies a maximum transport latency or a minimum bandwidth associated with a network subscription of the UE, and wherein selecting the first CU-UP of the multiple CU-UPs having the location that is within, or connected to, the selected one of the C-RAN, the MEC cloud, or the mobile core cloud is further based on the user profile.

5. The method of claim 1, wherein each of the plurality of DUs connects to a respective Radio Unit (RU) of a plurality of RUs, and wherein each of the plurality of RUs includes at least one antenna and associated transceiver circuitry.

6. The method of claim 1, wherein the performance parameters associated with the plurality of DUs include at least one of a network slice identifier (ID) or a QoS flow identifier associated with each respective DU of the plurality of DUs.

7. The method of claim 6, wherein the performance parameters associated with the plurality of DUs further include a Fifth generation (5G) QoS ID (5QI) associated with each respective DU of the plurality of available DUs.

8. One or more devices, comprising:

one or more processors, or logic, configured to:

distribute, using Network Functions Virtualization (NFV), multiple Control Unit-User Plane functions (CU-UPs) at multiple different locations within, or connected to, a centralized Radio Access Network (C-RAN), a Multi-Access Edge Computing (MEC) cloud, and a mobile core cloud, use self-organizing network (SON) functionality to organize and configure the multiple CU-UPs, a plurality of distributed units (DUs), and at least one Control Unit-Control Plane function (CU-CP) as a SON, wherein each of the plurality of DUs are connected to at least one of the C-RAN, the MEC cloud, or the mobile core cloud, receive, from the SON, SON configuration information and performance parameters associated with the plurality of DUs, select a first DU of the plurality of DUs based on the received SON configuration information and the performance parameters associated with the plurality of DUs, obtain at least one network performance requirement of an application or network service associated with transport involving a user equipment device (UE), select a first CU-UP of the multiple CU-UPs, having a location that is within, or connected to, a selected one of the C-RAN, the MEC cloud, or the mobile core cloud, for the transport along a first transport path that includes the selected DU, based on the at least one network performance requirement of the application or network service, and initiate the transport, involving the UE via the selected first DU and the selected first CU-UP, over the first transport path.

9. The one or more devices of claim 8, wherein the one or more processors, or logic, is further configured to:

receive, from a network management system of the SON, key performance indicator (KPI) measurements associated with the first transport path, determine if the KPI measurements associated with the first transport path satisfy the at least one network performance requirement of the application or network service, select, when the KPI measurements do not satisfy the at least one network performance requirement, a second CU-UP of the multiple CU-UPs for the transport along a second transport path that includes the selected DU, based on the at least one network performance requirement of the application or network service, and initiate the transport, involving the UE via the selected first DU and the selected second CU-UP, over the second transport path.

10. The one or more devices of claim 8, wherein the at least one network performance requirement comprises a maximum transport latency of the first transport path.

11. The one or more devices of claim 8, wherein the one or more processors, or logic, is further configured to:

obtain a user profile associated with the UE, wherein the user profile specifies a maximum transport latency or a minimum bandwidth associated with a network subscription of the UE, and wherein selecting the first CU-UP of the multiple CU-UPs having the location that is within, or connected to, the selected one of the C-RAN, the MEC cloud, or the mobile core cloud is further based on the user profile.

12. The one or more devices of claim 8, wherein each of the plurality of DUs associated with the wireless station connects to a respective Radio Unit (RU) of a plurality of RUs, and wherein each of the plurality of RUs includes at least one antenna and associated transceiver circuitry.

13. The one or more devices of claim 8, wherein the performance parameters associated with the plurality of DUs include at least one of a network slice identifier (ID) or a QoS flow identifier associated with each respective DU of the plurality of available DUs.

14. The one or more devices of claim 13, wherein the performance parameters associated with the plurality of DUs further include a Fifth generation (5G) QoS ID (5QI) associated with each respective DU of the plurality of available DUs.

15. At least one non-transitory storage medium storing instructions executable by one or more devices, wherein the instructions cause the one or more devices to:
- distribute, using Network Functions Virtualization (NFV), multiple Control Unit-User Plane functions (CU-UPs) at multiple different locations within, or connected to, a centralized Radio Access Network (C-RAN), a Multi-Access Edge Computing (MEC) cloud, and a mobile core cloud;
- use self-organizing network (SON) functionality to organize and configure the multiple CU-UPs, a plurality of distributed units (DUs), and at least one Control Unit-Control Plane function (CU-CP) as a SON, wherein each of the plurality of DUs are connected to at least one of the C-RAN, the MEC cloud, or the mobile core cloud;
- receive, from the SON, SON configuration information and performance parameters associated with the plurality of DUs;
- select a first DU of the plurality of DUs based on the received SON configuration information and the performance parameters associated with the plurality of DUs;
- obtain at least one network performance requirement of an application or network service associated with transport involving a user equipment device (UE);
- select a first CU-UP of the multiple CU-UPs, having a location that is within, or connected to, a selected one of the C-RAN, the MEC cloud, or the mobile core cloud, for the transport along a first transport path that includes the selected DU, based on the at least one network performance requirement of the application; and
- initiate the transport, involving the UE via the selected first DU and the selected first CU-UP, over the first transport path.

16. The at least one non-transitory storage medium of claim 15, wherein the instructions further cause the one or more devices to:
- receive, from a network management system of the SON, key performance indicator (KPI) measurements associated with the first transport path;
- determine if the KPI measurements associated with the first transport path satisfy the at least one network performance requirement of the application or network service;
- select, when the KPI measurements do not satisfy the at least one network performance requirement of the application or network service, a second CU-UP of the multiple CU-UPs for the transport along a second transport path that includes the selected DU, based on the at least one network performance requirement of the application or network service; and
- initiate the transport, involving the UE via the selected first DU and the selected second CU-UP, over the second transport path.

17. The non-transitory storage medium of claim 15, wherein the performance parameters associated with the plurality of DUs include at least one of a network slice identifier (ID) or a QoS flow identifier associated with each respective DU of the plurality of DUs.

18. The non-transitory storage medium of claim 17, wherein the performance parameters associated with the plurality of DUs further include a Fifth generation (5G) QoS ID (5QI) associated with each respective DU of the plurality of available DUs.

19. The non-transitory storage medium of claim 15, wherein the instructions further cause the one or more devices to:
- obtain a user profile associated with the UE, wherein the user profile specifies a maximum transport latency or a minimum bandwidth associated with a network subscription of the UE, and
- wherein selecting the first CU-UP of the multiple CU-UPs having the location that is within, or connected to, the selected one of the C-RAN, the MEC cloud, or the mobile core cloud is further based on the user profile.

20. The non-transitory storage medium of claim 15 of claim 1, wherein the at least one network performance requirement comprises a maximum transport latency of the first transport path.

* * * * *